US012675550B2

(12) United States Patent (10) Patent No.: US 12,675,550 B2
Lomen et al. (45) Date of Patent: Jul. 7, 2026

(54) PATTERN RECOGNITION IN SIGNALS

(71) Applicant: BAE Systems Information and Electronic Systems Integration Inc., Nashua, NH (US)

(72) Inventors: Brandt J. Lomen, Beford, NH (US); Paul Monahan, Acton, MA (US); Matthew Anderson, Mont Vernon, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1127 days.

(21) Appl. No.: 17/712,630

(22) Filed: Apr. 4, 2022

(65) Prior Publication Data

US 2023/0315806 A1 Oct. 5, 2023

(51) Int. Cl.
*G06F 17/18* (2006.01)

(52) U.S. Cl.
CPC .................................... *G06F 17/18* (2013.01)

(58) Field of Classification Search
CPC ...... G06F 17/18; G06F 18/2323; G06F 18/26; G06F 18/29; G06F 7/02; G06F 2207/025
See application file for complete search history.

(56) References Cited

U.S. PATENT DOCUMENTS 8,452,108 B2 5/2013 Walch
8,560,469 B2 10/2013 Laine et al.

8,626,690 B2 1/2014 Aharon et al.
8,683,423 B2 * 3/2014 Amaral ............... G06F 11/3604
717/104
2003/0014408 A1 * 1/2003 Robertson ............... G06F 17/18
2017/0046602 A1 * 2/2017 Hu ......................... G06T 11/206
2021/0406288 A1 * 12/2021 Wright ..................... G06N 7/01

OTHER PUBLICATIONS

Eynard Loris; et al., "Italic or Roman : Word Style RecognitionWithout a Priori Knowledge for Old Printed Documents", IEEE Computer Society, 2009 10th International Conference on Document Analysis and Recognition, 2009, 5 pages.
Raveaux Romain; et al., "Graph for Pattern Recognition", International Master of Research in Computer Science: Computer Aided Decision Support, in the RFAI groups at the University of Tours, Oct. 2016, 55 pages.

* cited by examiner

*Primary Examiner* — Carlo Waje
(74) *Attorney, Agent, or Firm* — Gary McFaline

(57) ABSTRACT

A method of recognizing a pattern in a signal is provided. The method includes receiving, by a processor and at an input, the signal comprising data; converting, by the processor and based on a plurality of features, the data from the signal into a collection of features; identifying, by the processor, one or more feature-to-feature transitions between features in the collection of features; plotting, by the processor, a directed graph of each of the feature-to-feature transitions, wherein each unique feature in the collection of features is represented by a single vertex and each feature-to-feature transition is represented by a directed edge between two vertices weighted by a corresponding number of each of the feature-to-feature transitions; and detecting, by the processor, a pattern in the data by comparing the weight of each of the feature-to-feature transitions in the directed graph to a user-defined threshold.

17 Claims, 12 Drawing Sheets

Features

Directed Graph of
Feature Transitions

326

Directed Graph of
Feature Transitions

900

Feature Collection

Directed Graph of
Feature Transitions

1000

1100

PATTERN RECOGNITION IN SIGNALS

FIELD OF DISCLOSURE

The present disclosure relates to signal processing, and more particularly, to techniques for analyzing signal features and recognizing patterns in the features.

BACKGROUND

Pattern recognition techniques are used to identify regularities in a set of data. For example, newly acquired information can be compared to known, or a priori, data to determine whether similarities exist for classification purposes. Graph theory is a mathematical pattern recognition technique for modeling pairwise relations between data objects, where vertices (nodes) representing data objects are connected together by edges (links or arcs) representing the relationships between vertices. A directed graph is a graph that includes a set of vertices connected by directed, or asymmetrical, edges. The orientation (direction) of the edge defines the predecessor-successor relationship between the incident vertices.

Although the following detailed description will proceed with reference being made to illustrative examples, many alternatives, modifications, and variations thereof will be apparent in light of this disclosure.

DETAILED DESCRIPTION

Overview

In accordance with an example of the present disclosure, a method of recognizing a pattern in a signal. The method includes receiving, at an input, the signal comprising data. Based on a plurality of features that are used to detect or otherwise recognize patterns in the data, the data from the signal is converted into a collection of features (e.g., a set or time series of individual features). One or more feature-to-feature transitions between features are then identified within the collection of features. For example, if a first feature in the signal is followed by a second feature, then a transition from the first feature to the second feature can be identified. These feature-to-feature transitions are then plotted as a directed graph, where each unique feature in the collection of features is represented by a single vertex and each feature-to-feature transition is represented by a directed edge between two vertices. Each edge is weighted by a corresponding number of each of the feature-to-feature transitions. For example, if there are two transitions from the first feature to the second feature in the data, then the edge between vertices representing the first and second features has a weight of two. From the plot of the directed graph, a pattern in the data is detected or otherwise recognized by comparing the weight of each of the feature-to-feature transitions in the directed graph to a user-defined threshold, which can be set to any value depending on which features are relevant for recognizing repeating patterns in the data. For example, feature-to-feature transitions that occur only once may not reliably represent a pattern, while feature-to-feature transitions that occur multiple times may represent a pattern that can be detected using the disclosed techniques.

Existing pattern recognition techniques are commonly trained from labeled training data, which define known relationships in existing data. For example, graph theory can be used to identify newly acquired data, such as image data, having the same pattern or patterns defined in the training data. When no training data are available, a trial-and-error analysis can be performed to fit or match the newly acquired data to a set of defined regular features. However, such trail-and-error analysis is primarily effective only when performed against all possible outcomes, which is computationally expensive. Therefore, non-trivial issues remain with respect to pattern recognition in signals.

Graph Diagrams for Representing Data Patterns

Figure 1:
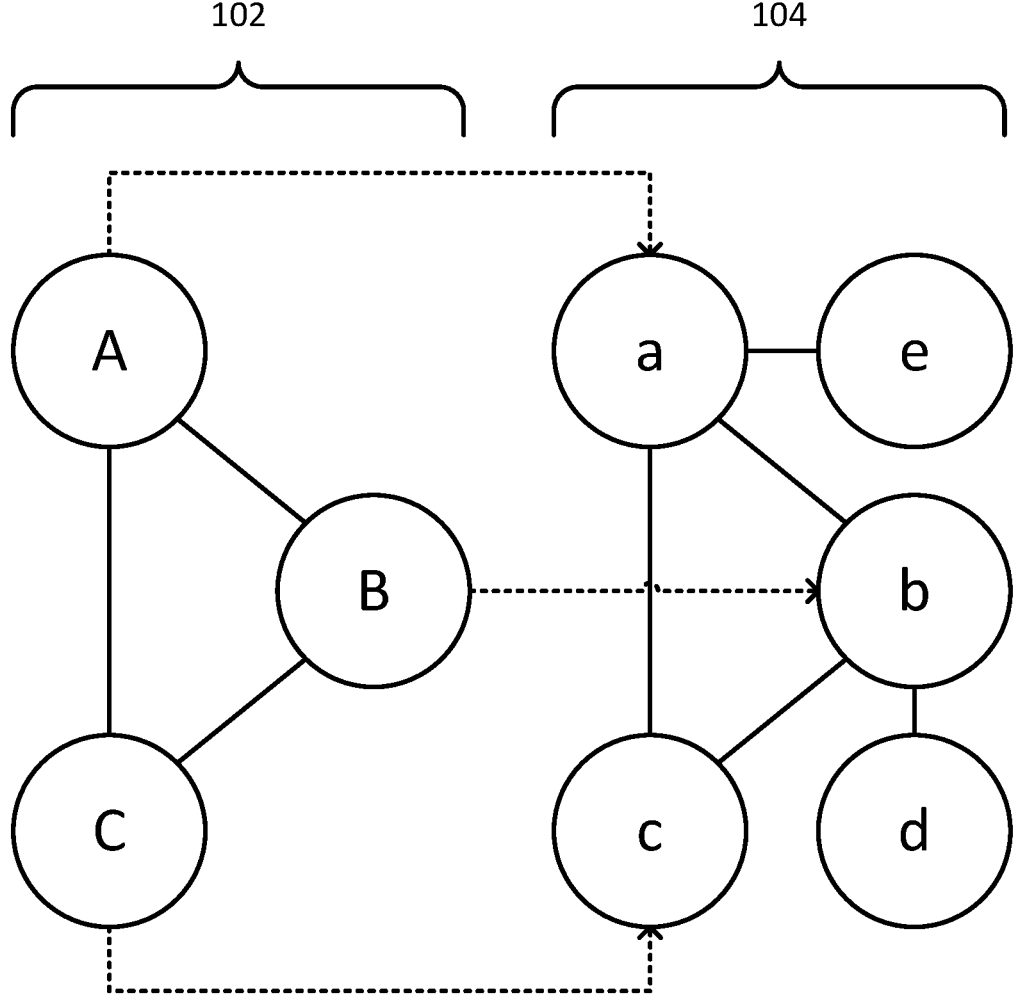
FIG. 1 is a graph diagram representing data patterns, in accordance with an example of the present disclosure.

FIG. 1 is a graph diagram representing data patterns, in accordance with an example of the present disclosure. Graph theory can be used for structural pattern recognition in data. For example, patterns in existing data 102, represented by vertices A, B, and C, can be found within a more complex pattern of input data 104, represented by vertices a, b, c, d, and e. In this example, the vertices A, B, and C, and their corresponding edges, in the existing data 102 correspond to a similar pattern among vertices a, b, and c in the input data 104. Such graphs can be used for complex situations, such as recognizing objects within photos and patterns within complex matrix data. However, these methods require a comparison of graphs making them dependent on a priori information.

In cases where a priori information is limited or unavailable, algorithms can be designed to identify patterns in other ways. For example, an algorithm can be created to determine if text is Italic or Roman without a priori knowledge of any text. This can be accomplished by first defining the different features of the text, such as the slant angle of italicized characters. To complete pattern recognition, the algorithm performs a trial and error analysis in which a single word of text is tested for being a Roman text word. The algorithm provides a score of how closely the word resembles Roman characters. The algorithm then adjusts the angle of the characters and again provided a score. If the score is higher after adjusting text, the algorithm determines that the word is italicized. This method of pattern recognition can consume excessive processing resources when the data is analyzed against all possible outcomes.

Pattern Recognition System for Signals

Figure 2:
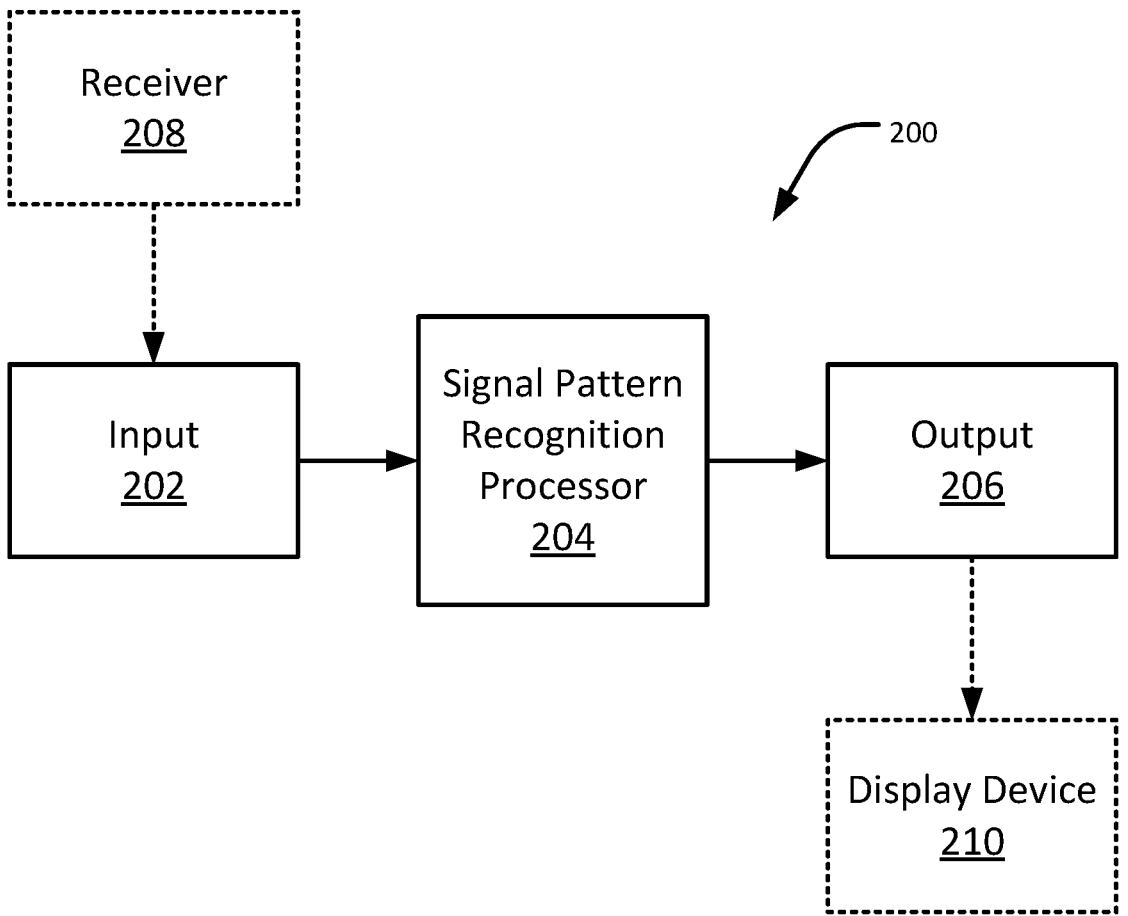
FIG. 2 is a block diagram of a signal pattern recognition system, in accordance with an example of the present disclosure.

FIG. 2 is a block diagram of a signal pattern recognition system 200, in accordance with an example of the present disclosure. The system 200 includes a signal pattern recognition processor 204 configured to receive an input 202 and to produce an output 206. The input 202 and the output 204 include signals representing data or other information. In some examples, the inputs 202 represent signals received via a signal receiver 208, although it will be understood that the input 202 can represent any type of data received from any source. In some examples, the outputs 206 are provided to a display device 210 (e.g., a monitor or printer) in a human readable format.

As will be described in further detail below, the signal pattern recognition processor 204 analyzes the input 202 to identify patterns within the signal data and to produce, as the outputs 206, plots and/or other pattern matching statistics that can be used to further analyze the data in the input 202. The signal pattern recognition processor 104 does not presume that any of the data in the input 202 have been previously recognized when performing the analysis.

Figure 3:
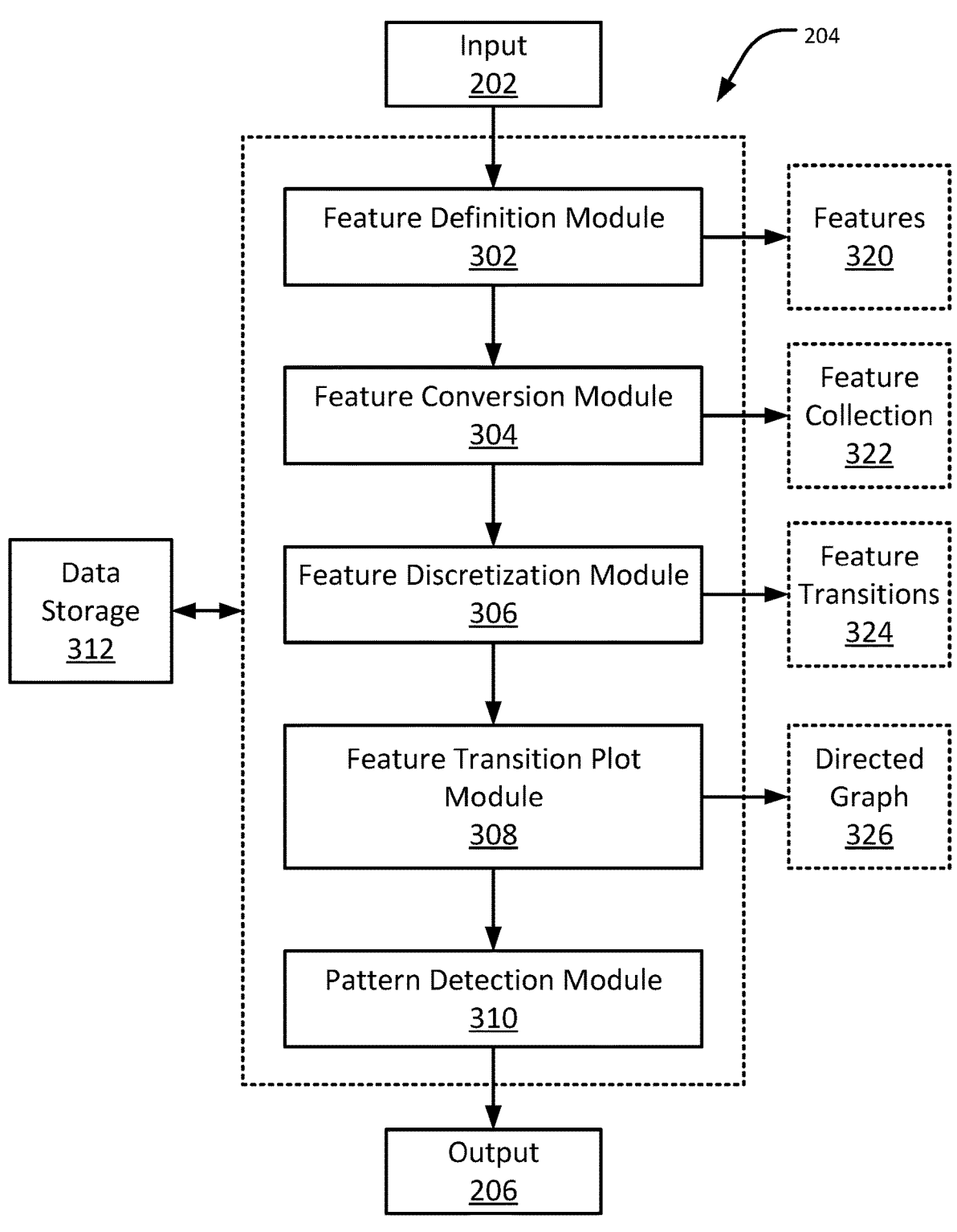
FIG. 3 is a block diagram of the signal pattern recognition processor of FIG. 2, in accordance with an example of the present disclosure.

Other componentry and functionality not reflected in FIGS. 2 and 3 will be apparent in light of this disclosure, and it will be appreciated that other examples are not limited to any particular hardware configuration. For example, the processor 204 is configured to perform the functions of system 200, such as described herein and with respect to FIG. 3. The processor 204 can be any suitable processor and may include one or more coprocessors or controllers. In some examples, the processor 204 can be implemented as any number of processor cores. The processor 204 (or processor cores) can be any type of processor, such as, for example, a micro-processor, an embedded processor, a digital signal processor (DSP), a graphics processor (GPU), a network processor, a field programmable gate array or other device configured to execute code. The processor 204 can include multithreaded cores in that they may include more than one hardware thread context (or "logical processor") per core. The processor 104 can be implemented as a complex instruction set computer (CISC) or a reduced instruction set computer (RISC) processor.

The processor 204 can be configured to execute an operating system (OS), such as Google Android (by Google Inc. of Mountain View, Calif.), Microsoft Windows (by Microsoft Corp. of Redmond, Wash.), Apple OS X (by Apple Inc. of Cupertino, Calif.), Linux, or a real-time operating system (RTOS). As will be appreciated in light of this disclosure, the techniques provided herein can be implemented without regard to the particular operating system provided in conjunction with the system 200, and therefore may also be implemented using any suitable existing systems or platforms. It will be appreciated that in some examples, some of the various components of the system 200 can be combined or integrated in a system-on-a-chip (SoC) architecture. In some examples, the components may be hardware components, firmware components, software components or any suitable combination of hardware, firmware or software.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The examples are not limited in this context.

Signal Pattern Recognition Processor

FIG. 3 is a block diagram of the signal pattern recognition processor 204 of FIG. 2, in accordance with an example of the present disclosure. The signal pattern recognition processor 204 includes a feature definition module 302, a feature conversion module 304, a feature discretization module 306, a feature transition plot module 308, and a pattern detection module 310. A data storage 312, the input 202, and the output 206 are coupled to the signal pattern recognition processor 204. The data storage 312 provides a memory (persistent and/or non-persistent) for storing data during processing by the various components of the signal pattern recognition processor 204. The data storage 312 can be implemented using any suitable type of digital storage including, for example, a volatile memory device such as a RAM, dynamic RAM (DRAM), or static RAM (SRAM) device.

In overview, the signal pattern recognition processor 204 is configured to extract patterns from the input 202 to determine if any data in the signal can be recognized based on one or more features 320 defined for recognizing the patterns. The feature definition module 302 defines the features 320 used for pattern recognition. The features 320 can include, for example, data bits, collections of signal characteristics, individual data points, and/or a sequence of values. In some examples, at least some of the features are unique, which improves the ability to determine whether the input 202 includes a uniquely recognizable pattern.

After producing the feature definitions, the feature conversion module 304 converts raw data from the input 202 to a collection of features 322. The feature discretization module 306 then discretizes the collection of features 322 is by identifying feature-to-feature transitions 324. The feature transition plot module 308 plots the feature-to-feature transitions 324 as a directed graph 326, where each unique feature is represented by a single vertex (node) and each feature-to-feature transition is represented by a directed edge (path) between vertices. Note that the plot can be represented by a data array stored in a memory or other data storage device. The pattern detection module 310 then compares the number of times a transition occurs in the directed graph 326 to a user-defined threshold to identify whether the transition is part of a reoccurring pattern.

Feature Definition

Figure 4:
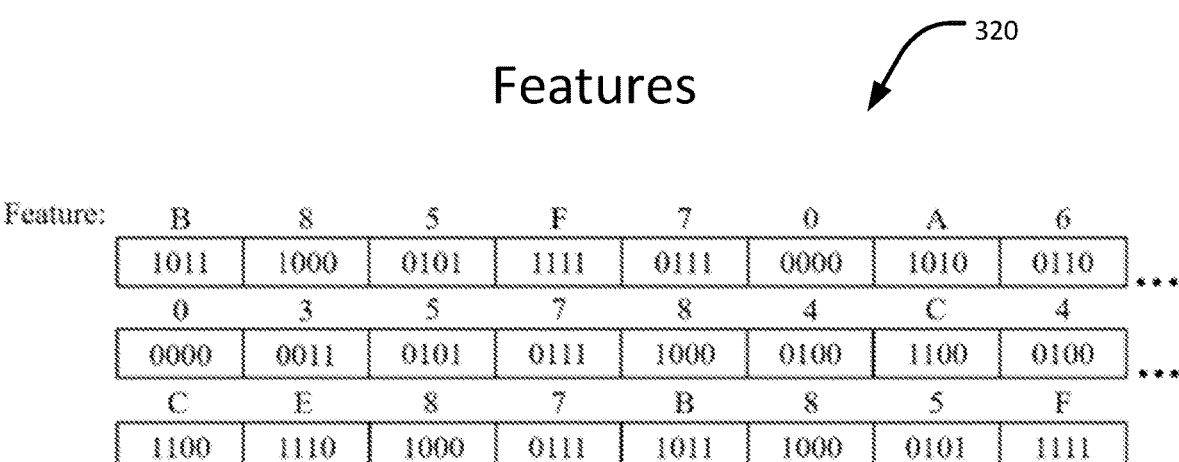
FIG. 4 shows one or more features defined for recognizing patterns by the signal pattern recognition processor of FIG. 2, in accordance with an example of the present disclosure.

FIG. 4 shows one or more features 320 defined for recognizing patterns in the input 202 by the feature definition module 302, in accordance with an example of the present disclosure. In this example, each of the features 320 is represented by unique sequences of hexadecimal numbers (e.g., the features 320 are defined as 'B', '8', '5', 'F', etc.). For example, '1011' is the four-bit binary representation of the hexadecimal number 'B' such that the corresponding feature 'B' is represented by four bits in the data. In FIG. 4, a portion of a single data bit stream of 96 bits is shown. In this example, the stream starts with pattern 'B85F' and ends with 'B85F'. Therefore, a pattern that can be recognized is the sequence of features is 'B85F'. It will be understood that more than one pattern can be recognized in a given sequence of features.

Within certain application domains, such as electronic warfare, the relationships between signals is useful. For example, in some cases, signals are received with unknown patterns. These patterns can exist within their receive times. Defining these patterns allows for better understanding about the signals themselves. Thus, a feature 320 can thus be defined as the combination of two or more signals and the difference in time between their occurrences.

Figure 5:
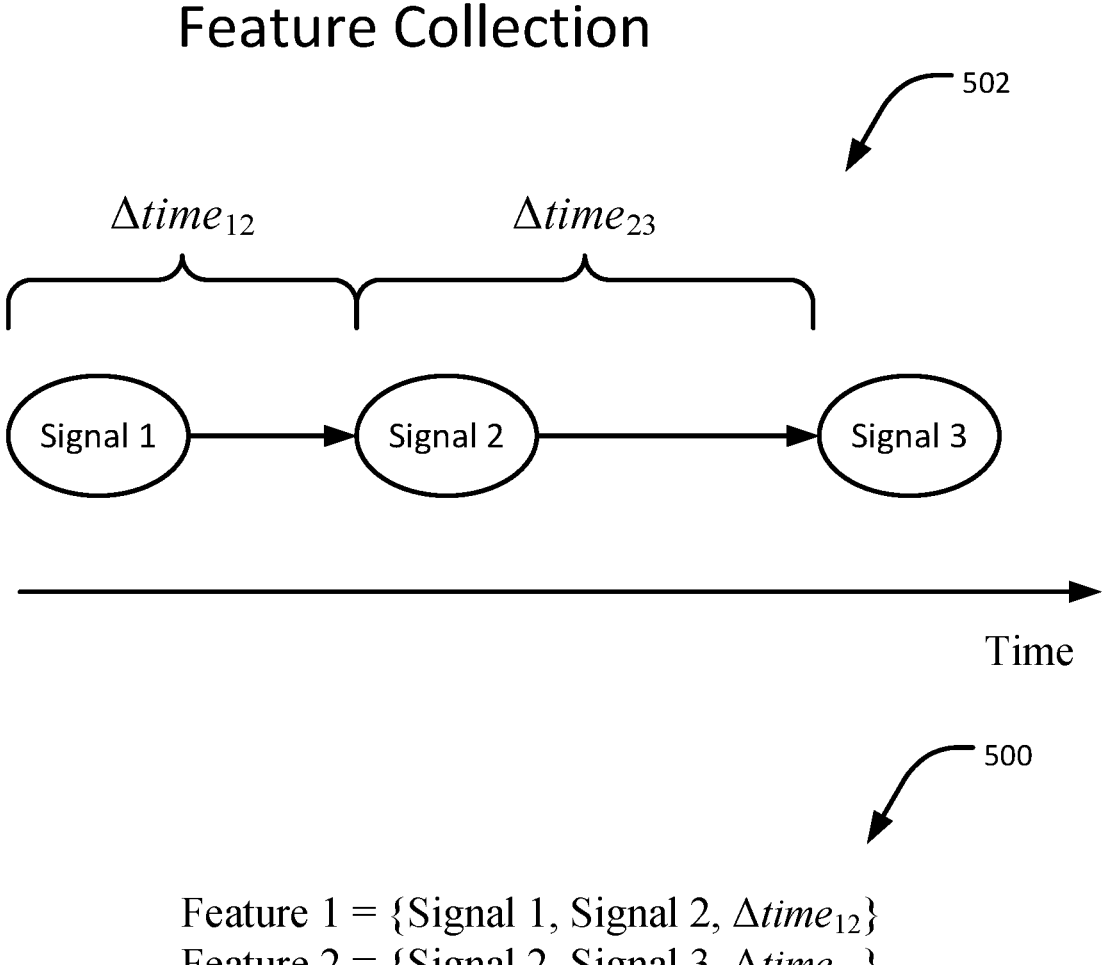
FIG. 5 shows an example feature definition for recognizing patterns by the signal pattern recognition processor of FIG. 2, in accordance with an example of the present disclosure.

FIG. 5 shows an example feature definition 500 where the pattern 502 includes transitions from Signal 1 to Signal 2 to Signal 3 with respective delta times of $\Delta time_{12}$ between the occurrence of Signal 1 (e.g., a first sequence of values) and the transition to Signal 2 (e.g., a second sequence of values), and $\Delta time_{23}$ between the occurrence of Signal 2 (e.g., the second sequence of values) and the transition to Signal 3 (e.g., a third sequence of values).

Feature Conversion

Figure 6:
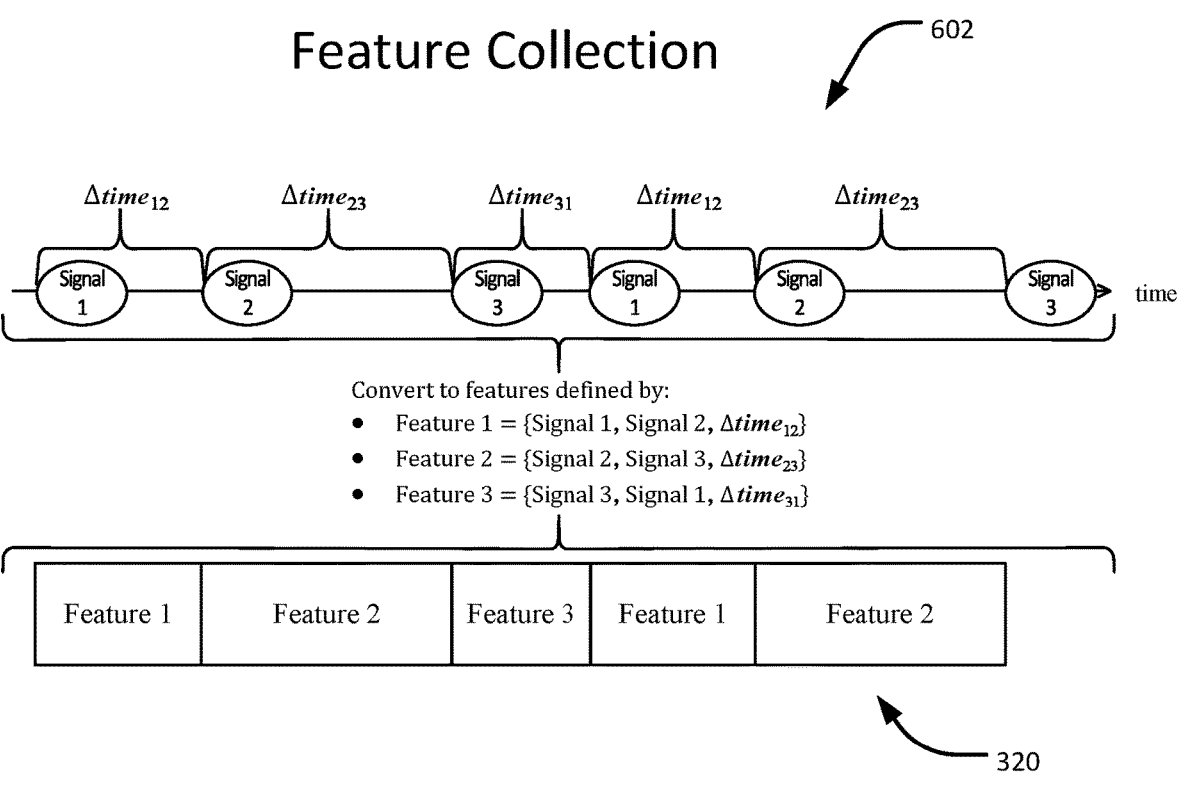
FIG. 6 shows a pattern of signals converted into features by the signal pattern recognition processor of FIG. 2, in accordance with an example of the present disclosure.

FIG. 6 shows a stream, or pattern, of signals 602 converted into the collection of features 322 by the feature conversion module 304 according to feature definitions 320, in accordance with an example of the present disclosure. In an examples, the converting includes comparing the data in the input 202 to a first sequence of values (e.g., a first feature 320), a second sequence of values (e.g., a second feature 320), and a delta time between occurrence of the first sequence of values and the second sequence of values in the data. Based on the comparison, the collection of features includes two or more of the features in sequence. For example, as shown in FIG. 6, the pattern from Signal 1 to Signal 2 with a delta time of $\Delta time_{12}$ is converted into Feature 1, the pattern from Signal 2 to Signal 3 with a delta time of $\Delta time_{23}$ is converted into Feature 2, and so forth according to the feature definitions 320, to produce a collection, or set, of features including Feature 1 and Feature 2 based on the comparison.

Feature Transitions and Directed Graph Plot

Figure 7:
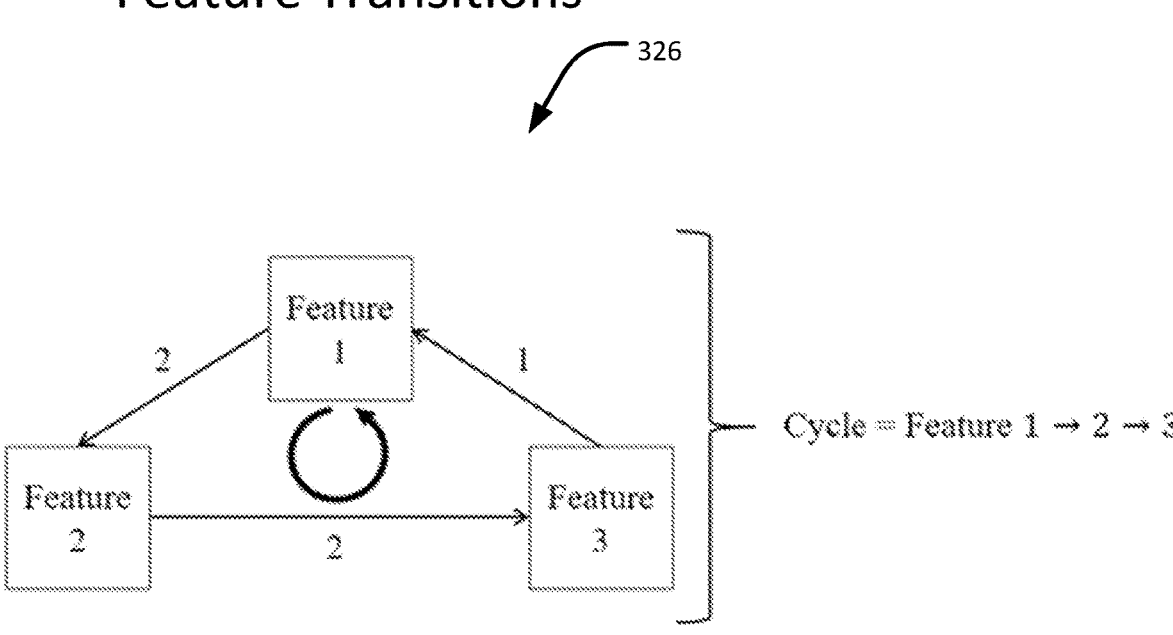
FIG. 7 is a directed graph plotted by the signal pattern recognition processor of FIG. 2, in accordance with an example of the present disclosure.
Figure 8:
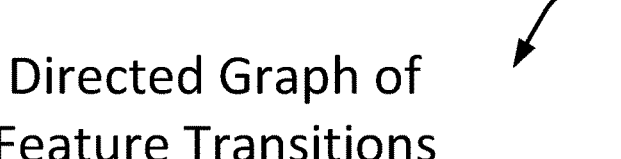
FIG. 8 is a directed graph plotted by the signal pattern recognition processor of FIG. 2, in accordance with another example of the present disclosure.
Figure 8:
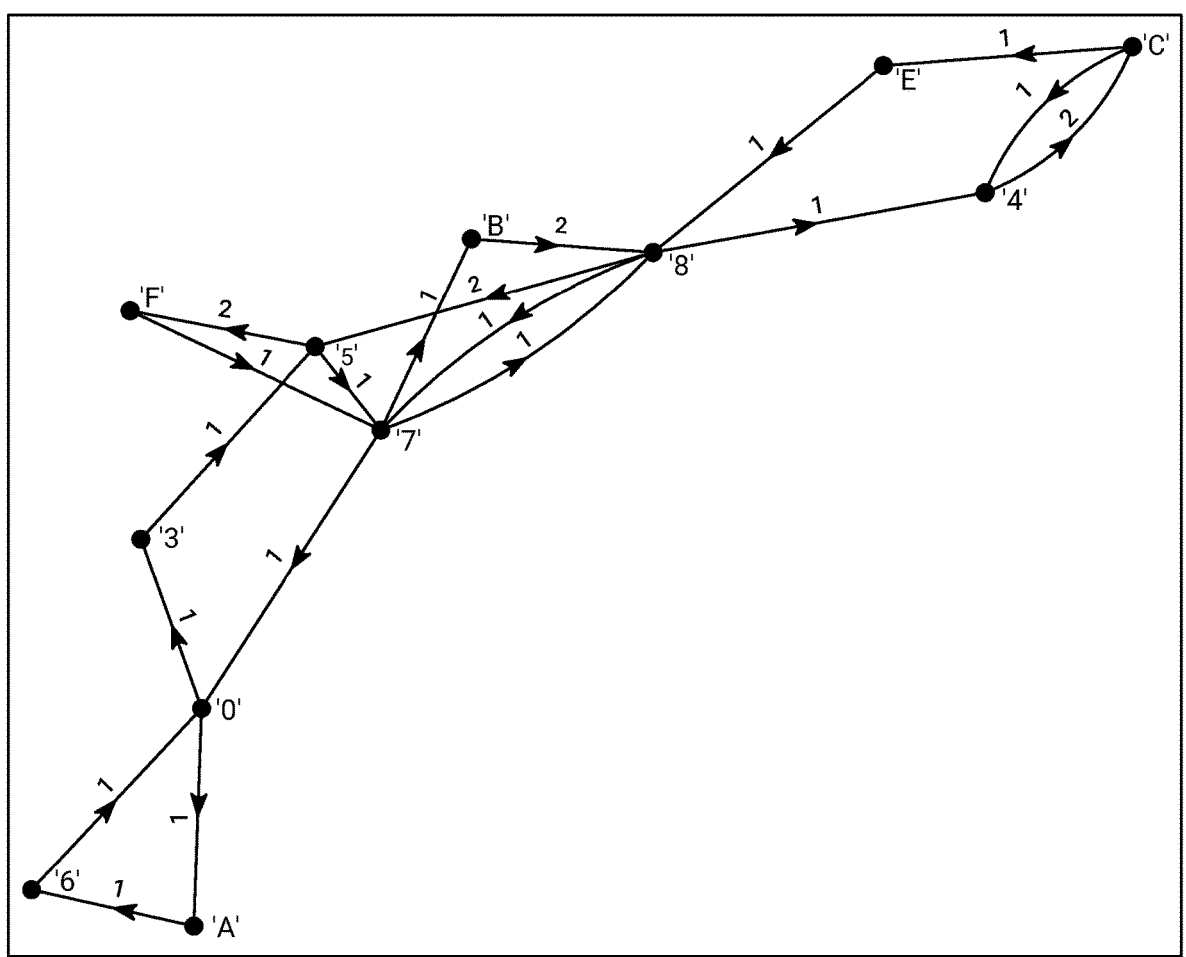

FIG. 7 is a directed graph 326 plotted by the feature transition plot module 308, in accordance with an example of the present disclosure. The directed graph 326 is generated from the conversion of signals 602 into features 320 by the feature discretization module 306 according to the feature definitions. The feature discretization module 306 identifies the number of times a feature 320 in the signal 602 transitions to another feature 320 (corresponding feature-to-feature transitions). The graph 326 depicts the relationships between the features 320 in time, where Feature 2 follows Feature 1 and Feature 3 follows Feature 2. Each directed edge between the vertices representing the respective features (e.g., Feature 1, Feature 2, and Feature 3) includes a weight representing a number of times a feature transitions 324 between each vertex occurs in the data. For example, in FIG. 7, there are two occurrences in the stream of features 320 in which Feature 1 is followed by Feature 2, represented by a weight of two, and one occurrence in which Feature 3 is followed by Feature 1. FIG. 8 is another directed graph 800, in accordance with an example of the present disclosure involving a more complex stream of features.

Pattern Recognition

Figure 12:
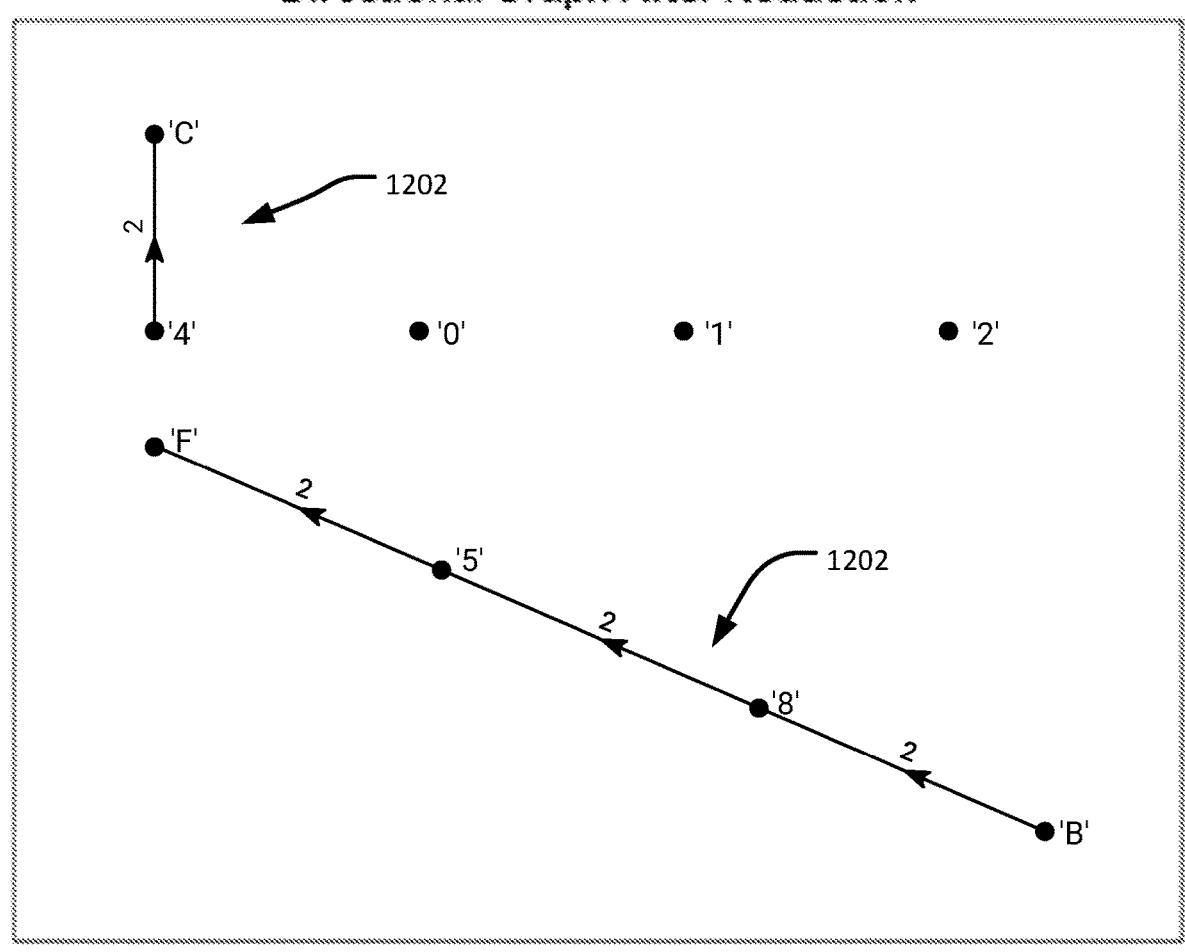
FIG. 12 is a filtered directed graph of feature-to-feature transitions in a signal, in accordance with an example of the present disclosure.

The pattern detection module 310 is configured to recognize and filter on the number of times a transition between two features 320 occurs. For example, the graph in FIG. 7 predicts the pattern to be, for example, Feature 1 to Feature 2 to Feature 3. This corresponds to a pattern from Signal 1 to Signal 2 to Signal 3 with respective time differences of $\Delta time_{12}$ and $\Delta time_{23}$. For example, after examining the graph in FIG. 7, the weights can be used to determine what is and is not part of a pattern. In this example, any transition path in the directed graph that has more than one occurrence can be considered a pattern. If all paths with one occurrence are deleted, a filtered directed graph can be generated, such as shown in FIG. 12. The pattern detection module 310 determines patterns corresponding to features 320 that have a continuous path 1202 between them. For example, two patterns with continuous paths 1202 can be extracted from the graph 1200: '4C' and 'B85F'. The first pattern ('4C') is an incidental pattern which, based on the length of the bits or values, can be ignored based on a user-defined threshold (e.g., a threshold of at least two transitions between the same features, or at least two transitions from a first sequence of values to a second sequence of values). The second pattern (B85F') is the true pattern as defined by the features 320 of FIG. 4. In this way, a 16-bit reoccurring pattern can be reconstructed with no a priori information.

Figure 9:
FIG. 9 shows a pattern of signals converted into features by the signal pattern recognition processor of FIG. 2, in accordance with another example of the present disclosure.
Figure 9:
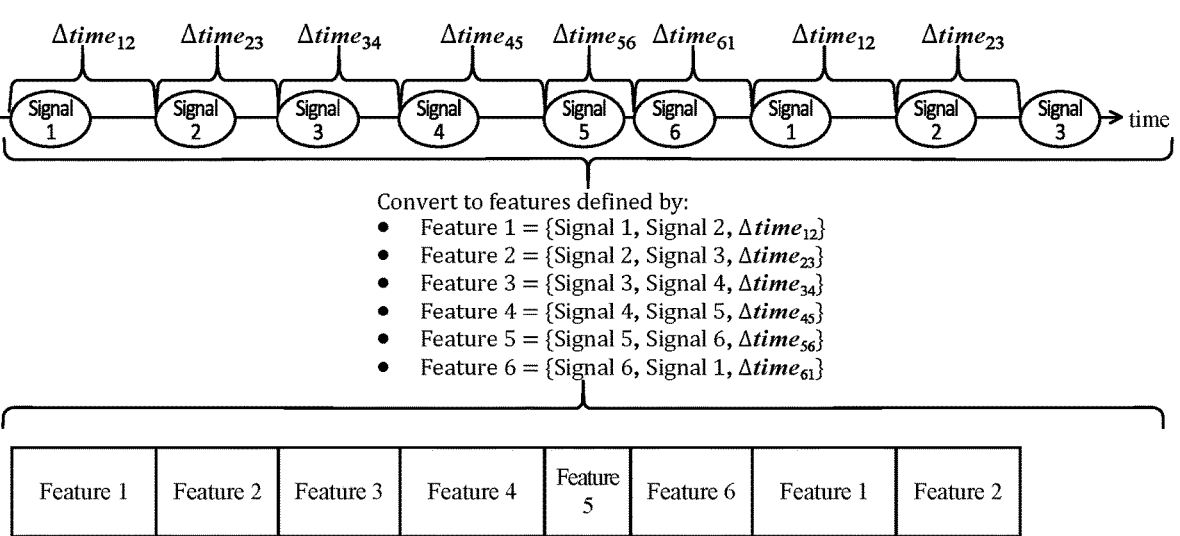
Figure 10:
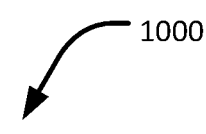
FIGS. 10 and 11 show directed graphs plotted by the signal pattern recognition processor of FIG. 2, in accordance with examples of the present disclosure.
Figure 10:
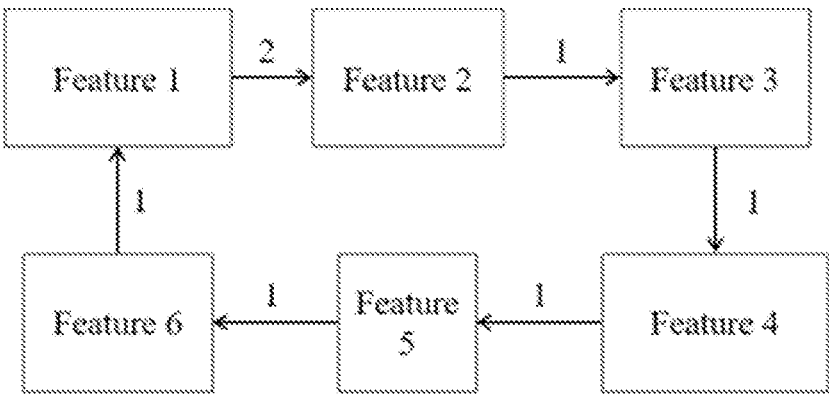
Figure 11:
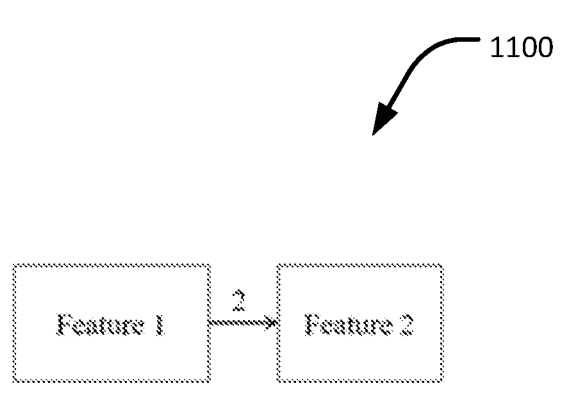

In more complex situations, distinct cycles become less apparent, such as shown in the stream of signals 900 in FIG. 9. Even with additional signals, only true repetitions are uncovered. For example, as shown in FIGS. 10 and 11, the path 1000 between Feature 1 to Feature 2 translates to a pattern 1100 of Signal 1 to Signal 2 to Signal 3 with respective times of $\Delta time_{12}$ and $\Delta time_{23}$, when incidental patterns (e.g., patterns that occur only once or less than a user-defined threshold) are deleted form the graph 1000.

Example Methodology

Figure 13:
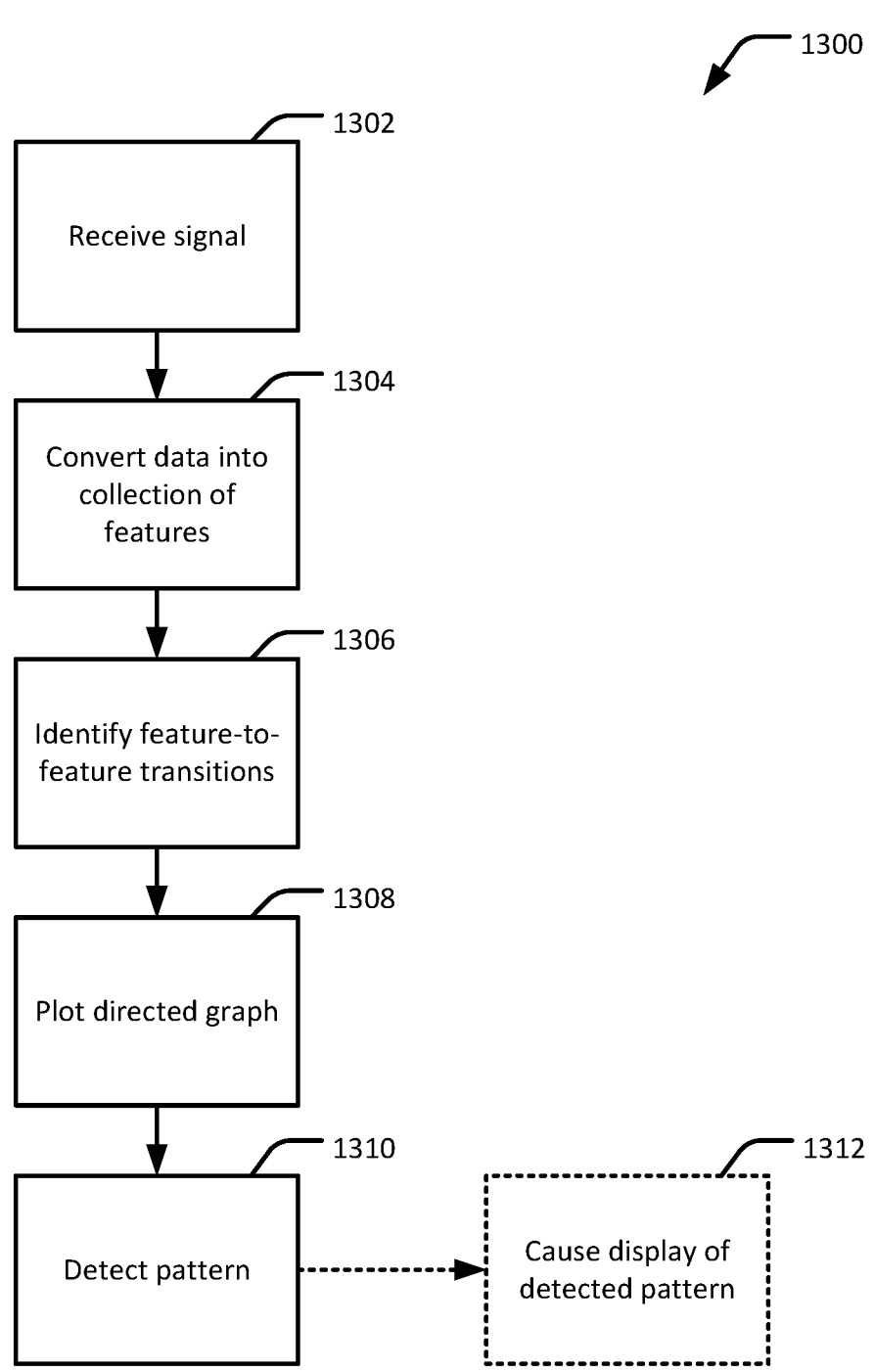
FIG. 13 is a flow diagram of a methodology for recognizing a pattern in a signal, in accordance with an example of the present disclosure.

FIG. 13 is a flow diagram of a methodology 1300 for recognizing a pattern in a signal, in accordance with an example of the present disclosure. The methodology 1300 can be implemented, for example, in the signal pattern recognition processor 204 of FIG. 2. The methodology 1300 includes receiving 1302, at an input, the signal comprising data and converting 1304, based on a plurality of features, the data from the signal into a collection of features. As noted above, the features can include, for example, data bits, collections of signal characteristics, individual data points, and/or a sequence of values. In some examples, at least some of the features are unique, which improves the ability to determine whether the data includes a uniquely recognizable pattern. In some examples, the converting 1304 includes comparing the data to a first sequence of values, a second sequence of values, and a delta time between occurrence of the first sequence of values and the second sequence of values in the data, where the collection of features includes two or more of the features in sequence based on the comparison, such as shown in FIGS. 5, 6 and 9.

The methodology 1300 further includes discretizing the input data by identifying 1306 one or more feature-to-feature transitions between features in the collection of features. For example, the number of times a feature in the signal transitions to another feature (corresponding feature-to-feature transitions) is identified or calculated, such as the number of times a first feature is followed by a second feature in the data. In some examples, each of the feature-to-feature transitions is defined by the first sequence of values, the second sequence of values, and the delta time, such as shown in FIGS. 5, 6, and 9.

The methodology 1300 further includes plotting 1308 a directed graph of each of the feature-to-feature transitions, where each unique feature in the collection of features is represented by a single vertex and each feature-to-feature transition is represented by a directed edge between two vertices weighted by a corresponding number of each of the feature-to-feature transitions, such as shown in FIGS. 7, 8,

10, 11, and 12. The methodology 1300 further includes detecting 1310 or recognizing a pattern in the data by comparing the weight of each of the feature-to-feature transitions in the directed graph to a user-defined threshold. For example, any transition path in the directed graph that has more than one occurrence can be considered a pattern, or only transition paths where the corresponding weight equals or exceeds a user-defined threshold. For instance, the user-defined threshold can be at least two feature-to-feature transitions from the first sequence of values to the second sequence of values.

In some examples, the methodology 1300 further includes causing 1312 a display device to display the detected pattern.
Example MATLAB Code for Pattern Recognition The following is an example of MATLAB code that can be used to generate a directional graph of feature-to-feature transitions, in accordance with an example of the present disclosure.

```
%Index up by one
a = [11 8 5 15 7 0 10 6 0 3 5 7 8 4 12 4 12 14 8 7 11 8 5 15]+1;
%Generate relationship between first and second features
transitions = [a(1:end−1)' a(2:end)'];
pathNames = unique(transitions,'rows');
%Create node names
nodes = ["'0'" "'1'" "'2'" "'3'" "'4'" "'5'" "'6'" "'7'"...
    "'8'" "'9'" "'A'" "'B'" "'C'" "'D'" "'E'" "'F'"];
%Determine how many times a transition occurred.
weight = zeros(1,length(pathNames(:,1)));
for i = 1:length(pathNames(:,1))
    weight(i) = sum(and(pathNames(i,1)==transitions(:,1),...
        pathNames(i,2)==transitions(:,2)));
end
G = digraph(pathNames(:,1),pathNames(:,2),weight,nodes);
close all
figure
plot(G,'Layout','force','EdgeLabel',G.Edges.Weight)
title('Raw Directional Graph')
figure
pathNames(weight<=1,:)=[ ];
weight(weight<=1) = [ ];
G1 = digraph(pathNames(:,1),pathNames(:,2),weight,nodes);
plot(G1,'Layout','force','EdgeLabel',G1.Edges.Weight)
title('Directional Graph After Reduction')
```

Further Example Examples

The following examples pertain to further examples, from which numerous permutations and configurations will be apparent.

Example 1 provides a method of recognizing a pattern in a signal. The method includes receiving, by a processor and at an input, the signal comprising data; converting, by the processor and based on a plurality of features, the data from the signal into a collection of features; identifying, by the processor, one or more feature-to-feature transitions between features in the collection of features; plotting, by the processor, a directed graph of each of the feature-to-feature transitions, wherein each unique feature in the collection of features is represented by a single vertex and each feature-to-feature transition is represented by a directed edge between two vertices weighted by a corresponding number of each of the feature-to-feature transitions; and detecting, by the processor, a pattern in the data by comparing the weight of each of the feature-to-feature transitions in the directed graph to a user-defined threshold.

Example 2 includes the subject matter of Example 1, further including defining, by the processor, each of the plurality of features as a unique sequence of values.

Example 3 includes the subject matter of any one of Examples 1-2, wherein each of the plurality of features includes a unique sequence of values.

Example 4 includes the subject matter of any one of Examples 1-3, wherein the converting includes comparing the data to a first sequence of values, a second sequence of values, and a delta time between occurrence of the first sequence of values and the second sequence of values in the data, and wherein the collection of features includes two or more of the features in sequence based on the comparison.

Example 5 includes the subject matter of Examples 4, wherein each of the feature-to-feature transitions is defined by the first sequence of values, the second sequence of values, and the delta time.

Example 6 includes the subject matter of Example 5, wherein the user-defined threshold is at least two feature-to-feature transitions from the first sequence of values to the second sequence of values.

Example 7 includes the subject matter of any one of Examples 1-6, further including causing a display device to display the detected pattern.

Example 8 provides a pattern recognition system including a data storage; and at least one processor coupled to the data storage and configured to execute a process includes receiving, at an input, a signal comprising data; converting, based on a plurality of features, the data from the signal into a collection of features; identifying one or more feature-to-feature transitions between features in the collection of features; plotting a directed graph of each of the feature-to-feature transitions, wherein each unique feature in the collection of features is represented by a single vertex and each feature-to-feature transition is represented by a directed edge between two vertices weighted by a corresponding number of each of the feature-to-feature transitions; and detecting a pattern in the data by comparing the weight of each of the feature-to-feature transitions in the directed graph to a user-defined threshold.

Example 9 includes the subject matter of Example 8, wherein the process further includes defining each of the plurality of features as a unique sequence of values.

Example 10 includes the subject matter of any one of Examples 8-9, wherein each of the plurality of features includes a unique sequence of values.

Example 11 includes the subject matter of any one of Examples 8-10, wherein the converting includes comparing the data to a first sequence of values, a second sequence of values, and a delta time between occurrence of the first sequence of values and the second sequence of values in the data, and wherein the collection of features includes two or more of the features in sequence based on the comparison.

Example 12 includes the subject matter of Example 11, wherein each of the feature-to-feature transitions is defined by the first sequence of values, the second sequence of values, and the delta time.

Example 13 includes the subject matter of Example 11, wherein the user-defined threshold is at least two feature-to-feature transitions from the first sequence of values to the second sequence of values.

Example 14 includes the subject matter of any one of Examples 8-13, wherein the process further includes causing a display device to display the detected pattern.

Example 15 provides a computer program product including one or more non-transitory machine-readable mediums encoded with instructions that when executed by one or more processors cause a process to be carried out for correlating signals, the process including converting, based on a plurality of features, data from the signal into a collection of features; identifying one or more feature-to-feature transitions between features in the collection of features; plotting a directed graph of each of the feature-to-feature transitions, wherein each unique feature in the collection of features is represented by a single vertex and each feature-to-feature transition is represented by a directed edge between two vertices weighted by a corresponding number of each of the feature-to-feature transitions; and detecting a pattern in the data by comparing the weight of each of the feature-to-feature transitions in the directed graph to a user-defined threshold.

Example 16 includes the subject matter of Example 15, wherein each of the plurality of features includes a unique sequence of values.

Example 17 includes the subject matter of any one of Examples 15-16, wherein the converting includes comparing the data to a first sequence of values, a second sequence of values, and a delta time between occurrence of the first sequence of values and the second sequence of values in the data, and wherein the collection of features includes two or more of the features in sequence based on the comparison.

Example 18 includes the subject matter of Example 17, wherein each of the feature-to-feature transitions is defined by the first sequence of values, the second sequence of values, and the delta time.

Example 19 includes the subject matter of Example 17, wherein the user-defined threshold is at least two feature-to-feature transitions from the first sequence of values to the second sequence of values.

Example 20 includes the subject matter of any one of Examples 15-19, wherein the process further includes causing a display device to display the detected pattern.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A method of recognizing a pattern in a signal, the method comprising:

receiving, by a processor and at an input, the signal comprising data;

converting, by the processor and based on a plurality of features, the data from the signal into a collection of features;

identifying, by the processor, one or more feature-to-feature transitions between features in the collection of features;

plotting, by the processor, a directed graph of each of the feature-to-feature transitions, wherein each unique feature in the collection of features is represented by a single vertex and each feature-to-feature transition is represented by a directed edge between two vertices weighted by a corresponding number of each of the feature-to-feature transitions; and detecting, by the processor, a pattern in the data by comparing a weight of each of the feature-to-feature transitions in the directed graph to a user-defined threshold;

wherein the converting includes comparing the data to a first sequence of values, a second sequence of values, and a delta time between occurrence of the first sequence of values and the second sequence of values in the data, and wherein the collection of features includes two or more of the features in sequence based on the comparison.

2. The method of claim 1, further comprising defining, by the processor, each of the plurality of features as a unique sequence of values.

3. The method of claim 1, wherein each of the plurality of features includes a unique sequence of values.

4. The method of claim 1, wherein each of the feature-to-feature transitions is defined by the first sequence of values, the second sequence of values, and the delta time.

5. The method of claim 4, wherein the user-defined threshold is at least two feature-to-feature transitions from the first sequence of values to the second sequence of values.

6. The method of claim 1, further comprising causing a display device to display the detected pattern.

7. A pattern recognition system comprising:

a data storage; and at least one processor coupled to the data storage and configured to execute a process comprising:

receiving, at an input, a signal comprising data;

converting, based on a plurality of features, the data from the signal into a collection of features;

identifying one or more feature-to-feature transitions between features in the collection of features;

plotting a directed graph of each of the feature-to-feature transitions, wherein each unique feature in the collection of features is represented by a single vertex and each feature-to-feature transition is represented by a directed edge between two vertices weighted by a corresponding number of each of the feature-to-feature transitions; and detecting a pattern in the data by comparing a weight of each of the feature-to-feature transitions in the directed graph to a user-defined threshold;

wherein the converting includes comparing the data to a first sequence of values, a second sequence of values, and a delta time between occurrence of the first sequence of values and the second sequence of values in the data, and wherein the collection of features includes two or more of the features in sequence based on the comparison.

8. The system of claim 7, wherein the process further comprises defining each of the plurality of features as a unique sequence of values.

9. The system of claim 7, wherein each of the plurality of features includes a unique sequence of values.

10. The system of claim 7, wherein each of the feature-to-feature transitions is defined by the first sequence of values, the second sequence of values, and the delta time.

11. The system of claim 7, wherein the user-defined threshold is at least two feature-to-feature transitions from the first sequence of values to the second sequence of values.

12. The system of claim 7, wherein the process further comprises causing a display device to display the detected pattern.

13. A computer program product including one or more non-transitory machine-readable mediums encoded with instructions that when executed by one or more processors cause a process to be carried out for correlating signals, the process comprising:

converting, based on a plurality of features, data from a signal into a collection of features;

identifying one or more feature-to-feature transitions between features in the collection of features;

plotting a directed graph of each of the feature-to-feature transitions, wherein each unique feature in the collection of features is represented by a single vertex and each feature-to-feature transition is represented by a directed edge between two vertices weighted by a corresponding number of each of the feature-to-feature transitions; and detecting a pattern in the data by comparing a weight of each of the feature-to-feature transitions in the directed graph to a user-defined threshold;

wherein the converting includes comparing the data to a first sequence of values, a second sequence of values, and a delta time between occurrence of the first sequence of values and the second sequence of values in the data, and wherein the collection of features includes two or more of the features in sequence based on the comparison.

14. The computer program product of claim 13, wherein each of the plurality of features includes a unique sequence of values.

15. The computer program product of claim 13, wherein each of the feature-to-feature transitions is defined by the first sequence of values, the second sequence of values, and the delta time.

16. The computer program product of claim 13, wherein the user-defined threshold is at least two feature-to-feature transitions from the first sequence of values to the second sequence of values.

17. The computer program product of claim 13, wherein the process further comprises causing a display device to display the detected pattern.

\* \* \* \* \*